United States Patent [19]

Yokogawa

[11] Patent Number: 4,977,553
[45] Date of Patent: Dec. 11, 1990

[54] METHOD AND APPARATUS FOR IDENTIFYING THE TYPE OF SERVO SYSTEM TO BE USED WITH A GIVEN DISC

[75] Inventor: Fumihiko Yokogawa, Saitama, Japan
[73] Assignee: Pioneer Electronic Corporation, Tokyo, Japan
[21] Appl. No.: 197,242
[22] Filed: May 23, 1988
[30] Foreign Application Priority Data May 22, 1987 [JP] Japan ............................. 62-125322

[51] Int. Cl.⁵ .............................................. G11B 7/00
[52] U.S. Cl. .................................... 369/44.26; 369/58
[58] Field of Search ................... 369/32, 45, 54, 58, 369/59, 111, 275, 50, 53, 44.11, 44.26, 44.27; 358/342

[56] References Cited

U.S. PATENT DOCUMENTS

| | | | |
|---|---|---|---|
| 4,426,693 | 1/1984 | Satoh et al. | 369/45 |
| 4,558,375 | 12/1985 | Sontheimer | 369/111 X |
| 4,695,904 | 9/1987 | Shinyagaito et al. | 358/342 |
| 4,773,036 | 9/1988 | Berens et al. | 364/900 |
| 4,789,975 | 12/1988 | Taniyama | 369/59 X |
| 4,827,462 | 5/1989 | Flannagan et al. | 369/32 |

FOREIGN PATENT DOCUMENTS 59-201271 11/1984 Japan .
63-4467 1/1988 Japan .

Primary Examiner—Robert L. Richardson
Attorney, Agent, or Firm—Sughrue, Mion, Zinn, Macpeak & Seas

[57] ABSTRACT

Identification of a tracking servo system type with which a recording disc is to be used. Data is provided to inform a recording/reproducing apparatus that user data is recorded for reproduction by either a sample servo system or a continuous reproduction servo system. Identification data is recorded in a constant angular velocity (CAV) format, in which the data, recorded a plurality of times in a predetermined region of the disc, is located in the same circumferential but a different radial location on the disc. The predetermined region may be in an inner or outer portion of the disc, and has a width greater than the eccentricity of the disc.

11 Claims, 3 Drawing Sheets

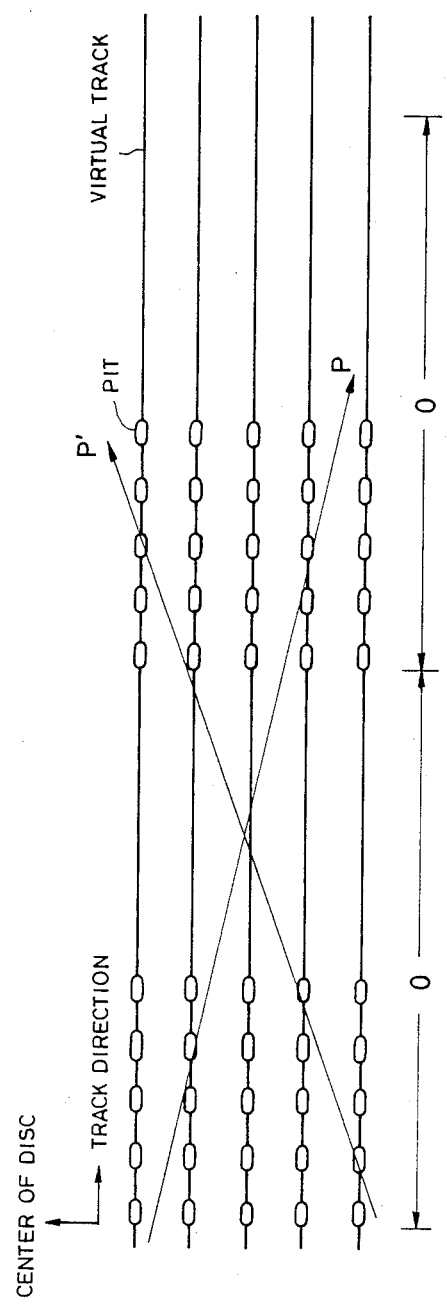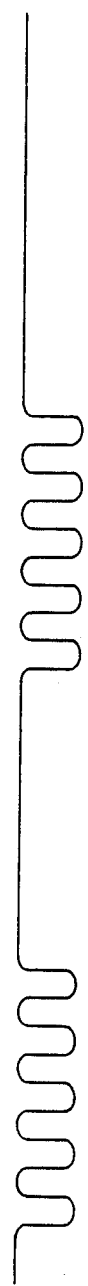

METHOD AND APPARATUS FOR IDENTIFYING THE TYPE OF SERVO SYSTEM TO BE USED WITH A GIVEN DISC

BACKGROUND OF THE INVENTION

The present invention relates to an optical disc and to a disc reproducing method for use in an optical disc apparatus. More specifically, the present invention pertains to an optical disc on which a predetermined identification or discrimination signal is recorded on each of a plurality of tracks, each track having a length equal to one revolution of the disc, within a predetermined region by a modulation system enabling these identification signals to be read when a tracking servo loop is open. The signals identify a type of servo tracking system (continuous or sample servo system) which may be used with the disc. The invention further relates to a disc reproducing method for opening the tracking servo loop when a pick-up traverses the plurality of tracks, synthesizing or combining the reproduced signals from the plurality of tracks on the disc in a single-track-reproducing manner, and treating these signals as a single continuous signal.

It is well known that there are two kinds of optical discs. One kind of disc has a track or groove continuously formed on the disc and the information is recorded in the groove or on the land formed between adjacent helical circumferential portions of the groove. As with compact optical discs and optical video discs, the optical disc of the present invention is controlled by a continuous tracking method in accordance with a push-pull principle, for example.

In another kind of optical disc, wobble pits are formed a fixed distance apart on the optical disc. These wobble pits are arranged to the left and right respectively, of track centerline (virtual track) to produce a tracking error signal by using the difference in RF signal levels produced when the respective wobble pits are read. Each tracking error signal is held until the disc rotates to the positions of the next wobble pits.

Conventionally, there is no groove on an optical disc containing a sample-servo which is used for track centering and there are no wobble pits on an optical disc which is used in a system which has continuous tracking control. Accordingly, an optical disc for an apparatus having a continuous tracking control system cannot be driven in an optical disc apparatus employing a sample-servo control system. Conversely, an optical disc for an apparatus having a sample-servo system cannot be driven in an optical disc apparatus employing a continuous tracking control system. Thus, it is necessary to identify the system with which the optical disc apparatus is to be used before using the disc with a particular apparatus.

In accordance with known approaches, an identification opening or hole has been made in a case accommodating an optical disc to identify the kind of operating system with which the disc is to be used. Consequently, it is necessary to make two kinds of cases for different discs, resulting in a high manufacturing cost.

SUMMARY OF THE INVENTION

It is an object of the present invention to overcome the disadvantage in known optical discs and methods of reproducing data recorded thereon by previously recording thereon an identification signal which is quickly detectable by any of a number of types of apparatus. The identification signal signifies the type of tracking system employed.

An optical disc according to the present invention has a first concentric region for recording any data desired by the user in a constant angular velocity (CAV) or constant linear velocity (CLV) format and a second region, for recording another data in the CAV format, said second region being concentric with the first region and having a width greater than the largest amount of eccentricity in the disc. The second region may constitute an inner or an outer part of the disc, and so may be inside or outside the first region. In the second region, signals for identifying a tracking servo system included in data are recorded by a modulation system by which the information may be read when the tracking servo loop is open. In addition, in the second region, the same data is previously recorded a plurality of times on respective tracks, for a CAV system, so that each version of the data is in the same circumferential position on the respective tracks.

In accordance with a method of reproducing data from such an optical disc in the present invention a pick-up is disposed in a predetermined region of the rotating disc and is held substantially in the region. The tracking servo loop is opened, and the pick-up is made to traverse different tracks of the region because of an eccentricity of the disc. As a result of traversing the neighboring tracks, the pick-up can combine the signals reproduced from the plurality of tracks as if the signals were derived from a single track, and can treat the signals as a single continuous reproducing signal. The system then can tell what tracking system (continuous or sample) is being used.

BRIEF DESCRIPTION OF THE DRAWINGS

Preferred implementations of the present invention now will be described in detail with reference to the accompanying drawings, in which:

FIGS. 1A and 1B are explanatory views of signal recording conditions on an optical disc according to the present invention;

DETAILED DESCRIPTION OF A PREFERRED EMBODIMENT

Figure 2:
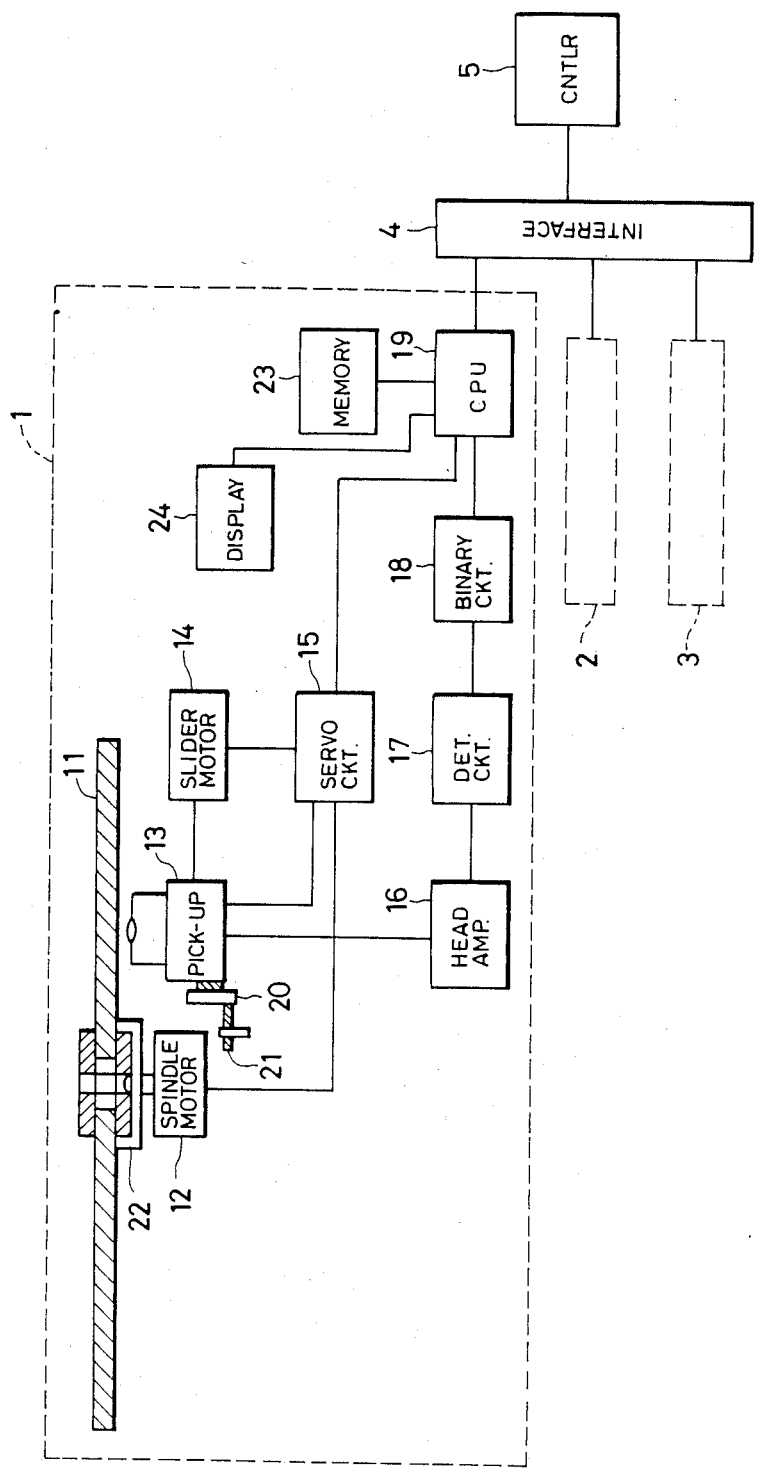
FIG. 2 is a block diagram of an information recording and reproducing apparatus according to the present invention.

The block diagram of FIG. 2 shows a first optical disc apparatus 1, another optical disc apparatus 2, and a magnetic disc apparatus 3. These apparatuses are connected to a controller 5, of a host computer or the like, through an interface 4.

When an appropriate command is issued from the controller 5 to one of these apparatuses through the interface 4, or when an optical disc 11 is installed on a turntable 22, the central processing unit (CPU) 19 starts its operation. Then the CPU 19 controls a servo circuit 15 to cause a spindle motor 12 to rotate at a predetermined angular speed (for example, 1800 rpm in CAV mode). The servo circuit 15 also controls the pick-up 13 to close a focus servo loop. In addition the servo circuit 15 controls a slider motor 14 and drives the pick-up 13 to butt against a stopper 20. The slider motor 14 is kept driving the pick-up 13 even after the pick-up butts into the stopper. As a result, even when for example, the apparatus vibrates or is slanted, the pick-up 13 is kept in contact with the stopper 20.

Figure 3:
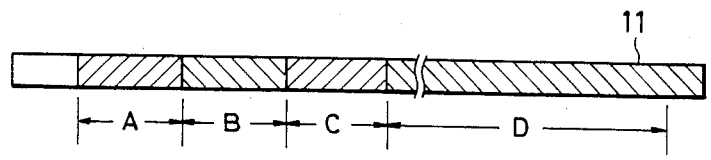
FIG. 3 is an explanatory view of a recording region on the disc of the present invention.

FIG. 3 is a cross sectional view of the optical disc. The surface of the optical disc 11 is divided, for example, into at least four regions as shown in FIG. 3. A predetermined identification signal is recorded in the innermost region A and other control signals are recorded in the region B adjacent to and outside the region A. The region C adjacent to and outside the region B contains data concerning the manufacturer of the optical disc 11. The user records his data on the outermost region D. Of course, the arrangement of these regions may be changed freely so that, for example, the innermost region A may be arranged at the outermost position of the optical disc.

In manufacturing the disc the data in the regions A to C are previously recorded as pits. The user records his data in the region D after purchasing the disc in CAV format or CLV format.

The pick-up 13 is placed at about the center of the region A. butting against the stopper 20. If the pick-up 13 is a little off center, a screw 21 for adjusting the position of the stopper 20 may be rotated forward or backward to control the position of the pick-up 13. As a result, the pick-up 13 may be stably situated substantially at the center of the region A.

Figure 4:
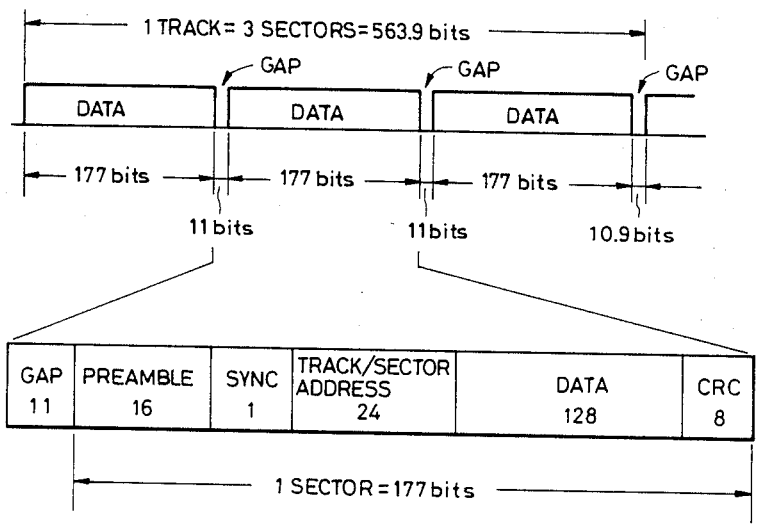
FIG. 4 is an explanatory view of a disc format according to the invention.

A plurality of tracks are formed in the region A. A track is defined by one unit of the region made up of a single revolution of the optical disc, and the length of one revolution may be divided into three sectors, as shown in FIG. 4. Each sector is 177 bits long, and a gap of 11 bits or 10.9 bits is provided between adjacent sectors. Each sector consists of a 16 bit preamble, one sync bit a 24 bit track and sector address 128 bits of data, and an 8 bit cyclic redundancy check (CRC) character for detecting errors. Identification signals for identifying the servo system are recorded in the place for the 128 bits of data in the sector on the optical disc. This data also includes other signals indicative of a reflection factor a discrimination between CAV and CLV a lead power of the laser in the pick-up, and an identification of track type (i.e. land or groove).

Figure 5:
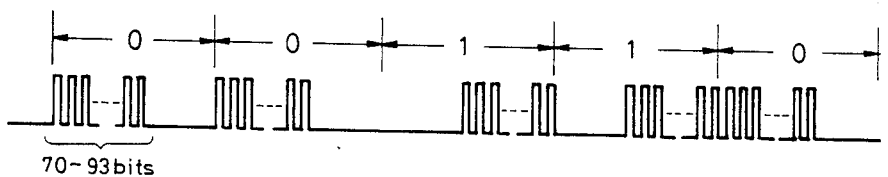
FIG. 5 is a wave diagram of the recording signal.

As shown in FIG. 5, each signal in respective sectors is digitally phase encoded, and the digital signals are recorded. That is, a logic 0 (zero) is expressed by forming a predetermined number (for example 70 to 93) of pits at about a 50% duty cycle in the front half of the bit cell and keeping the rear half flat, or mirror-like (reflective). A logic 1 (one) is expressed by making the front half of the bit cell flat or mirror-like (reflective) and forming a predetermined number (e.g. 70 to 93) of pits on the rear half thereof.

As described above, identical data is recorded respectively in three sectors of one track, and a plurality of tracks having the same sectors are formed in the region A. In general, any desired data is recorded on the region D of the optical disc in the CAV or CLV format, and is reproduced therefrom using a CAV or CLV method. However, as described above the data in the region A of the optical disc is recorded in the CAV format, and therefore is reproduced using the CAV method. Even if an optical disc has the region D having data recorded in the CLV format and the region A having data recorded in the CAV format an optical disc player, generally, detects the change of the format and drives the optical disc by selecting one of the CAV and CLV driving methods so that the data in both of the regions D and A can be accurately reproduced from the optical disc in accordance with the recording format of the data. As described above, the optical disc is rotating at a constant angular velocity (CAV) in the region A, so that the same signals are arranged at the identical circumferential position. The surface of the optical disc 11 obtained by the process mentioned above is shown in partial enlargement in FIG. 1A, in which the tracks are disposed parallel to a horizontal axis and the upward vertical direction is directed toward the center of the optical disc.

During a rising time, the CPU 19 controls the servo circuit 15 and opens the tracking servo loop. Because the optical disc 11 invariably rotates in an eccentric manner, the pick-up 13 for detecting information on the disc (a spot of light applied to the surface of optical disc) traverses a plurality of tracks on the disc along the direction from the inner side to the outer side of the disc or along the opposite direction (see arrows P and P' in FIG. 1A). The width of the region A is larger than that of the largest eccentricity of the optical disc 11. As a result the information detection point or a spotlight cannot be offset outside the region A. Because the identical signals are arranged at the same circumferential portions of respective tracks in the region A. even when the detection point traverses plural tracks, it is possible to reproduce the RF signal (see FIG. 1B) which is roughly the same as the RF signal obtained by tracing a single track (the virtual track).

The RF signal outputted from the pick-up 13 is amplified through a head amplifier 16 and inputted to a detecting circuit 17, which detects an envelope of the RF signal. The envelope of the RF signal detected by the detecting circuit 17 is wave-shaped or turned into a binary signal by a binary circuit 18, and the binary signal is inputted to the CPU 19. The CPU 19 temporarily records an amount of inputted data greater than that to be recorded in one sector. In the preamble of the sector, the identical logic is repeated 16 (sixteen) times. In the sync portion thereof, a logic different from that of the preamble is stored. The pattern of the logic mentioned above is adapted so as not to appear in other data. In consequence, by reading this logic pattern the sync is detected. Making the sync standard, the logic of other data is judged. As the position or phase of the pit in the bit cell shows the logic, it is possible to judge the logic when there is no clock signal synchronized with the reproducing signal.

As described above the CPU 19 synthesizes the reproduction signals reproduced from a plurality of tracks as if these reproduction signals were reproduced from a single track and treats them as a single continuous reproduction signal. The data to be applied for one sector of the track from the reproduction signals on the plurality of tracks is synthesized or combined. The type of tracking servo system is identified by the CPU 19 using the read data. When an optical disc for a continuous tracking system is installed on an optical disc drive apparatus having a sample servo system or a sample servo system optical disc is used in a drive apparatus having a continuous tracking system the CPU 19 ejects or rejects the objectionable optical disc and, if necessary, displays on an identification display 24 that the disc installed to the drive apparatus is the wrong one.

When the correct disc is installed, the CPU 19 moves the pick-up 13 to the regions B or C, closes the tracking servo loop, and reads the data. The CPU 19 controls the servo circuit 15 according to the data that is read rotates the optical disc 11 in a CLV or CAV manner as appropriate, and sets or changes a value of the lead power of a laser beam emitted by the pick-up 13 as appropriate. An appropriate signal is outputted to the controller 5 through the interface 4. The controller 5 monitors the condition of the optical disc apparatuses 1 and 2 and the magnetic disc apparatus 3, and issues a predetermined command to the apparatus identified by the received signal to make the apparatus perform the indicated function.

These commands are inputted to the CPU 19 through an interface 4. In accordance with the commands the CPU 19 moves the pick-up 13 to the region D, recording or reproducing the predetermined signal in a CLV or CAV manner.

In the above arrangement, the pick-up 13 is disposed and substantially fixed at the region A, butting the pick-up against the stopper 20. However, in accordance with other embodiments of the present invention, the position of the pick-up 13 may be detected by an optical scale and various sensors, and the pick-up 13 may be situated in the predetermined position by a positional servo system.

In accordance with the embodiment of the optical disc of the present invention, the disc is divided into a first region for recording data in CAV or CLV manner and a second region for storing identification data, recorded in a CAV format which is placed inside or outside of the first region. The second region is wider than the greatest amount of eccentricity of the disc, and contains data including the identification signal for identifying, at least, the tracking servo system. This data is previously recorded in multiple locations on tracks having respective lengths of one disc revolution by means of a phase encoding system which enables reading of the data when the tracking servo loop is open. In addition, the identical data is recorded in multiple locations on a plurality of tracks by a CAV method so that the data is disposed at the same circumferential position.

In accordance with the embodiment of the reproducing method of the optical disc of the present invention, the pick-up 13 is situated at a predetermined region of the rotating disc and set substantially in the region. The tracking servo loop is opened, and the pick-up traverses the tracks in the region recorded in view of disc eccentricity in order to synthesize the reproducing signals reproduced by the pick-up from a plurality of tracks as if they were reproduced from a single track, and to treat the resulting synthesized signal as a single continuous reproducing signal.

In consequence, in accordance with the present invention it is possible to reproduce any signal recorded on the disc of any kind.

Although respective embodiments of the disc and the disc reproducing method of the present invention have been disclosed and described, it is apparent that other embodiments and modifications of the invention are possible.

What is claimed is:

1. A recording disc having an eccentricity, said disc comprising:
   a first region, located concentrically on said recording disc and having an inner and outer radius, for recording user data; and
   a second region concentric with said first region and having an inner and outer radius, said second region having a width in a radial direction of said recording disc, that is larger than an amount of said eccentricity, said second region having recorded therein identification data for identifying a type of tracking servo loop system for said recording disc, said identification data being recorded a plurality of times in a CAV format by a phase-encoding system so as to be readable when said tracking servo loop is open.

2. A recording disc as claimed in claim 1, wherein said inner radius of said second region is less than said inner radius of said first region.

3. A recording disc as claimed in claim 1 wherein said inner radius of said second region is greater than said inner radius of said first region.

4. A recording disc as claimed in claim 1, wherein said identification data further comprises signals indicative of a reflection factor of said disc, a discrimination between said CAV and CLV format of said region, a lead power of a laser in a pick-up which reproduces said identification data, and an identification between a continuous tracking control system and a sample-servo control system.

5. A recording disc as claimed in claim 1, wherein said recorded identification data is disposed within each of a plurality of predetermined lengths substantially corresponding to one revolution of said disc, and wherein identical versions of said identification data are disposed in the same circumferential locations on said disc.

6. In a recorded disc reproducing system, a method of reproducing data recorded on a disc said disc being divided into a first region, located concentrically on said disc, and a second region concentric with said first region, said second region having a width, in a radial direction of said disc, that is larger than an amount of an eccentricity of said disc, said second region having recorded therein identification data for identifying a type of tracking servo loop system for said disc said identification data being recorded a plurality of times on a plurality of tracks in a constant angular velocity (CAV) format so as to be readable when said tracking servo loop is open, said method comprising the following steps:
   opening said tracking servo loop;
   causing a pick-up to traverse said tracks;
   reading said identification data;
   synthesizing said identification data to provide synthesized identification data;
   reproducing said combined data in accordance with said synthesizing step to provide reproduced data.

7. A method as claimed in claim 6, further comprising providing said second region with an inner radius which is less than inner radius of said first region.

8. A method as claimed in claim 6, further comprising providing said second region with an inner radius which is greater than an inner radius of said first region.

9. A method as claimed in claim 6, further comprising the steps of: determining whether said disc is of a proper type for said disc reproducing system, and informing a user of said disc reproducing system that said disc is of an improper type for use with said system only if said determining step determines that said disc is of an improper type for use with said system.

10. A method as claimed in claim 6, further comprising providing said identification data with signals indicative of: a discrimination between a CAV and a CLV format, a lead power of a laser in a pickup which reproduces said identification data, a reflection factor of said disc, and an identification between a continuous tracking control system and a sample-servo control system.

11. A method as claimed in claim 6, further comprising recording said identification data once within each of a plurality of predetermined lengths substantially corresponding to one revolution of said disc, and recording said identification data a plurality of times such that identical versions of said identification data are disposed in the same circumferential locations on said disc.

* * * * *